March 22, 1938.  V. W. KLIESRATH  2,111,563
MOTOR VEHICLE
Filed June 26, 1933   4 Sheets-Sheet 3
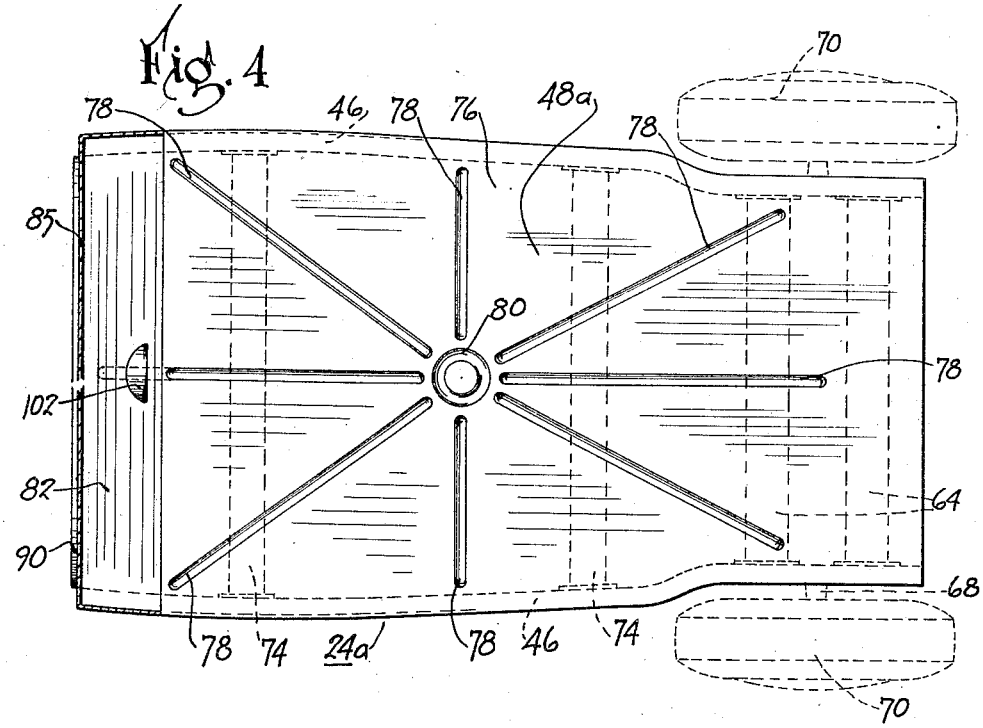
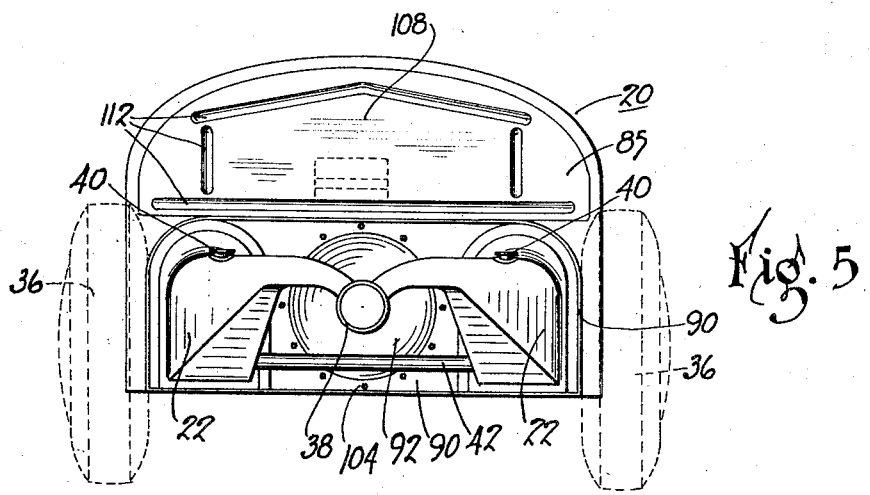
INVENTOR.
Victor W. Kliesrath
BY
ATTORNEY.

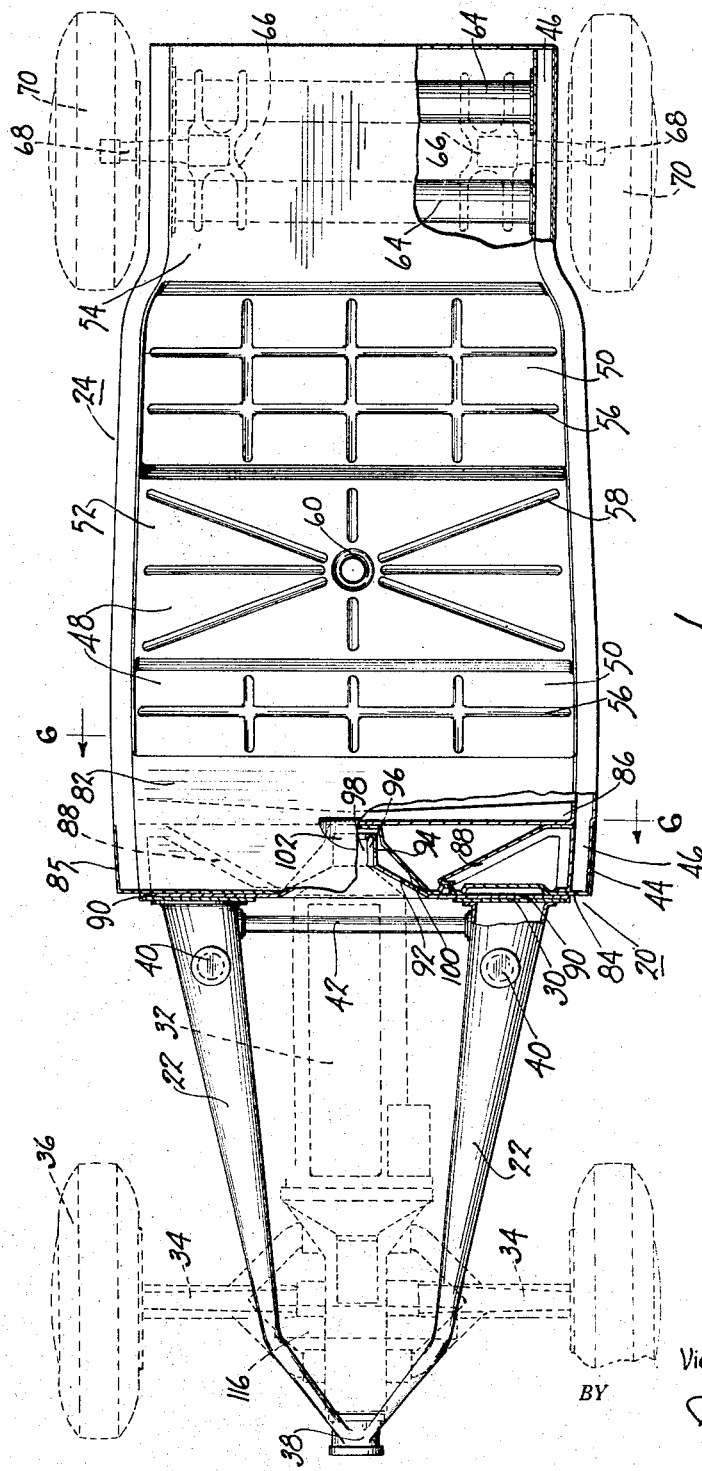

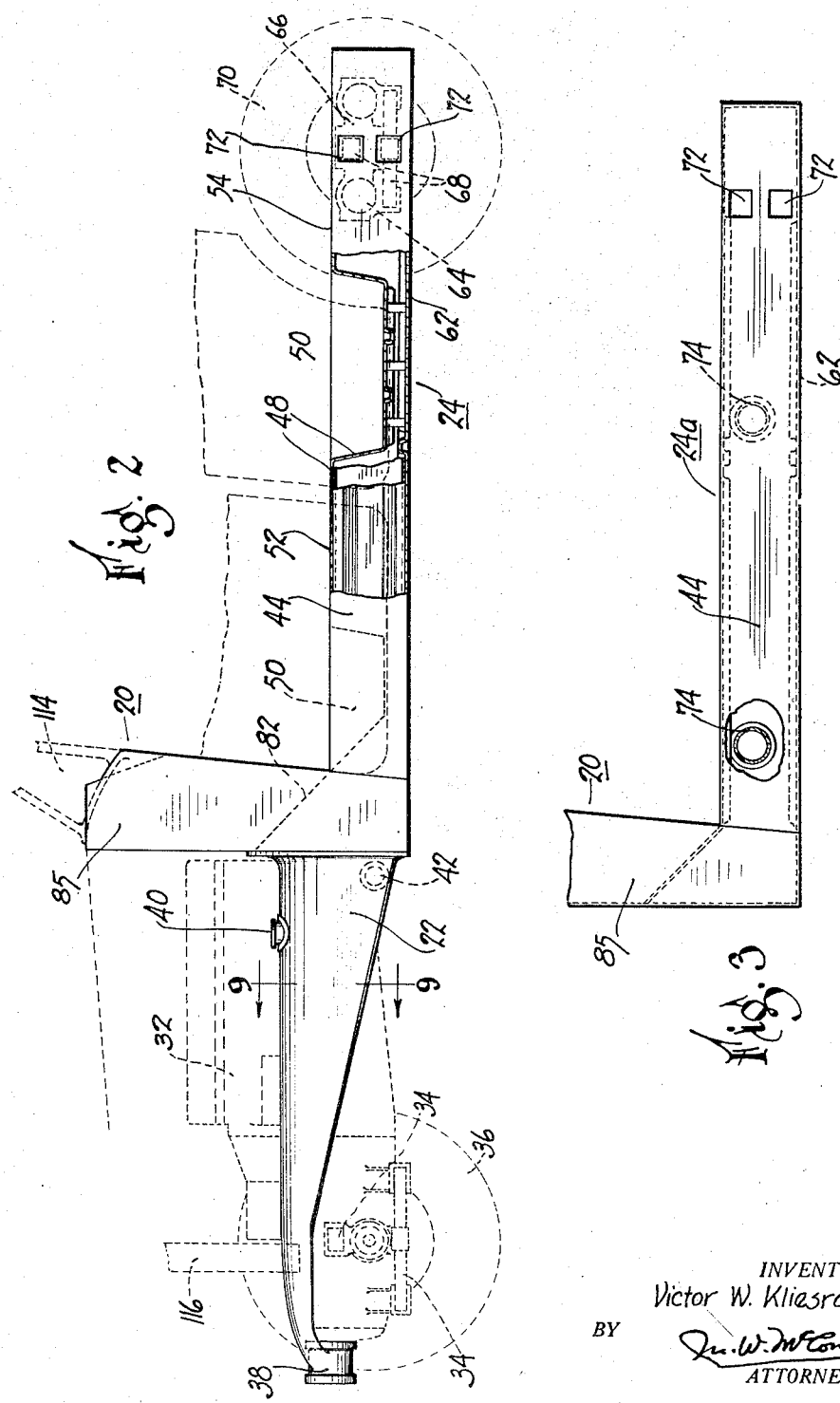

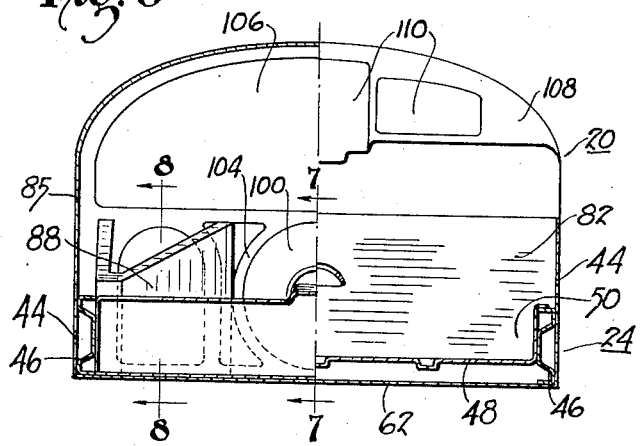
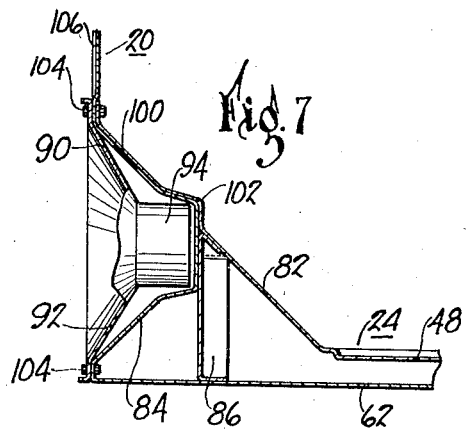
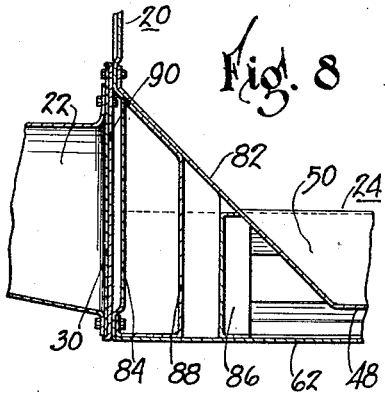
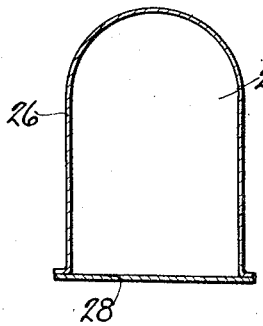

Patented Mar. 22, 1938

2,111,563

UNITED STATES PATENT OFFICE 2,111,563

MOTOR VEHICLE

Victor W. Kliesrath, South Bend, Ind., assignor to The Steel Wheel Corporation, Chicago, Ill., a corporation of New York Application June 26, 1933, Serial No. 677,610

15 Claims. (Cl. 180—64)

This invention relates to chassis for automobiles and the like, and is illustrated as embodied in a novel strong but light cantilever structure adapted to serve as a substitute for the usual chassis frame, or as the base of an automobile body.

In a general way, the requisite lightness and strength are secured by supporting the chassis structure at the front and rear of the car upon cantilever structures extending forwardly and rearwardly from a transverse rigid reinforced bridge, which preferably also serves as the dash of the car and which is shown as carrying the instrument board and the foot-board.

The two cantilever elements are so arranged as to have portions in compression and other portions in tension to take the major stresses and support the major part of the weight, and to transmit the stresses and the weight to the transverse bridge or dash, in which all of the stresses center themselves and which is preferably built up as a novel composite structure of welded sheet steel having the maximum of strength and rigidity and a minimum of weight.

The forwardly-extending section is preferably in the form of arms, shown in the illustrated embodiment as forwardly-tapering hollow stamped steel members, secured to opposite sides of the novel dash structure and extending forward on opposite sides of the engine. If desired, these arms (or one of them) may be utilized to form the fuel tank of the vehicle. When the tapered hollow stamped steel arms are used, they are secured at their larger ends or bases to the front face of the dash, with the smaller forward ends suitably connected.

I prefer to provide the dash-reinforcing means with a novel engine support or bearing, arranged in the center line of the chassis, and to provide a front engine support or bearing in the connection between the front ends of the above-described forwardly-extending arms. The chassis structure herein described is intended to be supported at its forward end on the engine, through these two novel engine supports, the engine preferably having individually-sprung right and left axle sections supported directly by the right and left front wheels, as described and claimed in my application No. 651,821, filed January 14, 1933. Thus part of the load is taken with a long lever arm at the extreme front ends of the cantilever arms, which part is taken directly by the dash on the rear engine support.

The rearwardly-extending section of the chassis also embodies in its structure substantial novelty, in the manner in which it is built up of side members and top and bottom steel plates connecting them, and preferably pressed with designs of grooves or channels which increase their rigidity, in the provision of transverse parallel and preferably tubular rear members to which the rear axle brackets may be attached, and in the utilization of novel transverse wells or channels just in front of the seats which serve to strengthen and reinforce the rear section or base and at the same time give greater foot-room without increasing the over-all height of the car. When such wells are used, it is of course necessary to step over the side members into the wells in entering the car.

The preferred form of dash also embodies novel features of structure, for example in the use of a substantially conical steel stamping which affords clearance for and which may support and engage the rear engine bearing and which serves to connect and diagonally brace and reinforce front and rear parallel vertical sections which are also preferably steel stampings.

The above and other objects and features of the invention, including various novel combinations of parts and desirable particular constructions, will be apparent from the following description of the illustrative embodiment shown in the accompanying drawings, in which:

Figure 1 is a top plan view of the novel chassis structure, partly broken away to show the tubular rear cross members and to show the dash, and with the positions of the wheels and the engine shown in dotted lines;

Figure 2 is a side elevation, partly broken away to show the structure and arrangement of one of the transverse wells;

Figure 3 is a side elevation of the dash and rear section of a modified construction, the front arms being omitted;

Figure 4 is a top plan view of the modified construction of the rear section shown in Figure 3, with the dash omitted;

Figure 5 is a front elevation of the complete chassis structure;

Figure 6 is a transverse section through the structure, on the line 6—6 of Figure 1;

Figure 7 is a partial longitudinal section on the line 7—7 of Figure 6, showing the rear engine bearing;

Figure 8 is a partial section on the line 8—8 of Figure 6, showing the attachment of one of the front cantilever arms; and Figure 9 is a section through one of these arms on the line 9—9 of Figure 2.

The novel chassis structure illustrated is intended to form the base of the body of an automobile having no separate chassis frame, and may from some points of view be regarded as a substitute for a chassis frame. It includes generally a novel built-up rigid transverse bridge such as a dash 20, a pair of spaced forwardly-extending cantilever arms 22 which support the weight at the front end of the chassis, and a novel rear built-up base section 24 supported at its rear end by the rear road wheels.

The front and rear sections may be regarded as cantilever elements, having parts in compression and other parts in tension and transmitting the stresses and weights to the transverse bridge or dash 20, in which they are all centered, and it will be noted in following the description below that the material of the main parts and of various separate reinforcements therefor is so distributed as to be mainly along the lines of such stresses so that a minimum amount of material may be used. This feature is important both from the standpoint of cost and from the standpoint of light weight.

The novel cantilever arms 22 are shown in the form of forwardly-tapering hollow stamped steel members, formed as shown in Figure 9 by welding together a channel-shaped stamping 26 and a bottom stamping 28. Each arm preferably has its larger end or base flanged, as shown in Figures 1, 2, 5, and 8, to be welded or otherwise secured to an end closure plate 30 which, with the end flange of the arm proper, is shown rigidly bolted to the forward face of the dash 20.

The arms 22 are intended to have arranged between them the engine or power plant 32 of the car, and as explained in my prior application No. 651,821 filed January 14, 1933 they preferably have a bearing for the front end of the power plant. As explained in said prior application, the power plant 32 preferably has yieldingly connected thereto right and left rigid axle sections 34 having the front road wheels 36 swiveled at their outer ends, the wheels being driven by the engine 32.

For this purpose, the front ends of arms 22 are shown as having welded thereto an engine support or bearing 38. Preferably the bearing 38 is internally vulcanized or otherwise bonded to a rubber bushing which is sleeved on and similarly bonded to a cylindrical boss on the front end of the engine 32.

If desired, one or both of the arms 22 may be utilized as a fuel tank, in that case being provided with a filler opening or openings each covered by a detachable cap 40 and (if both arms are so used) with a connecting tube 42 at the lowermost level of the arms.

The rear section or base 24 includes a peripheral sheet steel member 44, in one piece or more usually consisting of a series of stampings welded or riveted together at the four corners of the base, and seated against the opposite sides of which are two triple-channel structural side reinforcing elements 46 which appear in vertical section in Figure 6.

Over the top flanges of elements 46 is a floor section 48 which preferably, according to a special feature of the invention, has depressed therein a transverse channel or well 50 which provides great rigidity and strength transversely of the chassis. These wells are arranged just in front of the front and rear seats, which are intended to rest respectively on the elevated sections 52 and 54.

The bottoms of the wells 50 may be reinforced and made more rigid by stamping therein a pattern of grooves 56, and the portion 52 which is under the front seat is reinforced by grooves 58 radiating from an annular groove 60. The grooves 58 may in the finished car be filled with wooden strips, so that the floor mat or carpet will lie flat. The bottom of the box-section base is formed by a steel plate or stamping 62 (provided with suitable stiffening grooves if desired) riveted or welded to the lower faces of the side members 46.

It will be seen that the wells 50 not only strengthen the base, but that they also afford additional foot-room for the passengers without increasing the over-all height of the car, although they do make it necessary to step over the side members 46 in entering and leaving the car.

At the rear of the above-described base, I prefer to provide parallel tubular stiffening members or cross-bars 64, rigidly secured at their ends to the side members 46. These tubular members support (as fully described in my application No. 651,821) brackets 66 having sockets provided with rubber blocks which yieldingly hold the rear axle sections 68 at the outer ends of which the rear road wheels 70 are mounted. The sections 68 project through suitable openings 72 in the sides of the above-described base.

In the arrangement of Figures 3 and 4, instead of reinforcing the base 24a with the above-described wells 50, it is transversely stiffened by additional tubular cross members 74. In this case the top of this base section is in the form of a sheet steel plate or stamping 76 welded or riveted to the top flanges of the side members 46, and shown as having reinforcing and stiffening corrugations or grooves 78 radiating from a central annular groove 80. These grooves also are intended to be filled with strips of wood or the like, in the finished car, so that the floor pad or carpet will be flat.

The forward end of the top plate 48 is, as shown in Figure 7, inclined upwardly to form the usual inclined foot-rest 82, and is bolted or otherwise secured directly to the transverse bridge or dash 20.

In the arrangement shown, the central or major member 84 of the transverse bridge or dash 20 is an integral upwardly-bent extension of the bottom plate or stamping 62, although if preferred it may be a separate stamping welded or otherwise secured to the front end of the above-described base. The flanged upper or front edge of the inclined floor board 82 is bolted or otherwise secured thereto (Figures 7 and 8) giving a transverse triangular-section bottom portion of the dash which is of great rigidity.

This bottom portion of the dash is preferably additionally strengthened and rendered rigid by a transverse channel-section steel stamping 86 having its upper and lower flanges welded or riveted respectively to the lower face of the foot-board 82 and to the upper face of the bottom plate 62.

At opposite sides of the dash, the structure is additionally braced by generally V-shaped stampings 88 having their central portions or apexes engaging and if desired welded to the front face of the cross-stamping 86, and having the relatively-inclined legs flanged at their ends and bolted or welded to the vertical section 84. The lower edges of members 88 may have flanges engaging, and if desired secured to, the bottom plate 62, while similar flanges on their upper edges may engage (and if desired be secured to) the lower face of the inclined foot-board 82.

Engaging the front face of the lower half of the vertical portion 84, and bolted or otherwise secured thereto at its edges, is a vertical dash stamping 90 having a rearwardly-projecting central conical portion 92 terminating in a coaxial cylindrical rear engine support or bearing 94. The bearing 94 is internally vulcanized or otherwise bonded to a rubber bushing 96 which is sleeved on, and internally bonded to, a cylindrical boss 98 on the rear end of the engine housing.

The vertical section 8 is also formed with a somewhat deeper cone 100, terminating in a vertical circular head portion against which the end of the bearing 94 is seated, and which in turn seats against the transverse channel member 86 and against a sector-shaped depression 102 in the floor-board 82.

The two cones 92 and 100 are peripherally provided at their outer edges with superposed flat annular zones 104, forming what might be termed a bolting circle, and these superposed annular zones are bolted or otherwise secured together.

The above-described engine mounting is generally the same, so far as the engine itself is concerned, as is more fully described, and claimed, in my above-identified prior application No. 651,821, and is here referred to mainly as an explanation for the novel engine bearings or supports 38 and 94 which form parts of the improved chassis structure claimed herein, and through which bearings the weight is transmitted to the engine 32, which in turn transmits the weight through the axle sections 34 to the front wheels 36.

The vertical dash section 84 is continued upwardly, preferably integrally, above the rigid transverse bridge formed by the bottom of the dash, to form a cowl portion 106 supporting an instrument board 108 having suitable panels 110 for instruments, for storage compartments, and the like. As shown in Figure 5, the cowl portion 108 may be stiffened by suitably-arranged corrugations 112. The cowl portion 108 supports the usual wind-shield or the like 114 (Figure 2), while the usual radiator 116 may be supported by the cantilever arms 22.

While one illustrative embodiment has been described in detail, it is not my intention to limit the scope of the invention to that particular embodiment, or otherwise than by the terms of the appended claims. The present application is a partial continuation of my above-mentioned prior application No. 651,821.

I claim:

1. A chassis structure comprising a transverse dash having an engine support and having tapering hollow arms secured at their bases to its opposite sides and having their smaller ends connected by a second engine support.

2. A chassis structure comprising a transverse dash having tapering hollow arms secured at their bases to its opposite sides and having their smaller ends connected, at least one of said arms having a filler opening and being adapted to serve as a fuel tank.

3. A chassis structure comprising a transverse dash having tapering hollow arms secured at their bases to its opposite sides and having their smaller ends connected, one of said arms having a filler opening and said arms being in communication and being adapted to serve jointly as a fuel tank.

4. A chassis structure comprising a box-section internally-braced base with a transverse dash at its forward end, and having hollow tapered cantilever arms projecting forwardly from opposite sides of said dash.

5. A chassis structure comprising a substantially rigid transversely-extending dash and a load supporting structure extending forwardly therefrom, said structure including a hollow member secured to the dash and adapted to receive liquid fuel.

6. A chassis structure comprising a substantially rigid transversely-extending dash and a load supporting structure extending forwardly therefrom, said structure including a pair of forwardly-extending hollow members secured to the dash for receiving liquid fuel, and connecting means between said hollow members.

7. A chassis structure comprising a substantially rigid transversely-extending vertical dash, a rear cantilever section secured thereto, a front cantilever section secured thereto, said sections adapted to support the structure on wheels, a hollow member forming part of one of the sections and adapted to contain fuel, and a filling opening for the hollow member.

8. A chassis structure comprising a base including side members and a floor section secured to the side members, said floor section including transverse raised portions and transverse channel-shaped depressed portions, and seats mounted on the raised portions.

9. A chassis structure comprising a base including side members, a bottom plate secured to said side members and bent up at its forward portion and a top plate secured to the side members and bent up at its forward portion and connected to said bottom plate to form a vertical dash structure.

10. A chassis structure for a vehicle comprising a transverse dash having tapering hollow arms secured at their bases to its opposite sides and supported solely thereby and having their smaller ends connected, and means connecting said arms to a wheel whereby they support in part the weight of the vehicle.

11. In a chassis structure, a hollow cantilever arm having a base at its larger end, a dash, said base being secured to the dash, the arm tapering to a smaller section forwardly from said base, and a load supporting member, said smaller section secured to the load supporting member.

12. A dash comprising spaced mutually-braced transverse elements, one of which is shaped to form an inclined foot-board extending completely across the dash, and an instrument board carried by said dash.

13. A chassis structure comprising a base including side members and adapted to support front and rear seats in combination with a plate secured to said side members and formed with parallel channel-shaped transverse wells just in front of said seats respectively.

14. A chassis structure comprising a base including longitudinally-extending side members, and upper and lower plates secured thereto, said lower plate being substantially plane, and said upper plate being formed with transverse channel-shaped wells.

15. A chassis structure comprising a base including longitudinally-extending side members, and upper and lower plates secured thereto, said lower plate being substantially plane, and said upper plate being formed with transverse raised portions and transverse channel-shaped wells, and seat mounted on said raised portions.

VICTOR W. KLIESRATH.